United States Patent Office 3,198,270
Patented Aug. 3, 1965

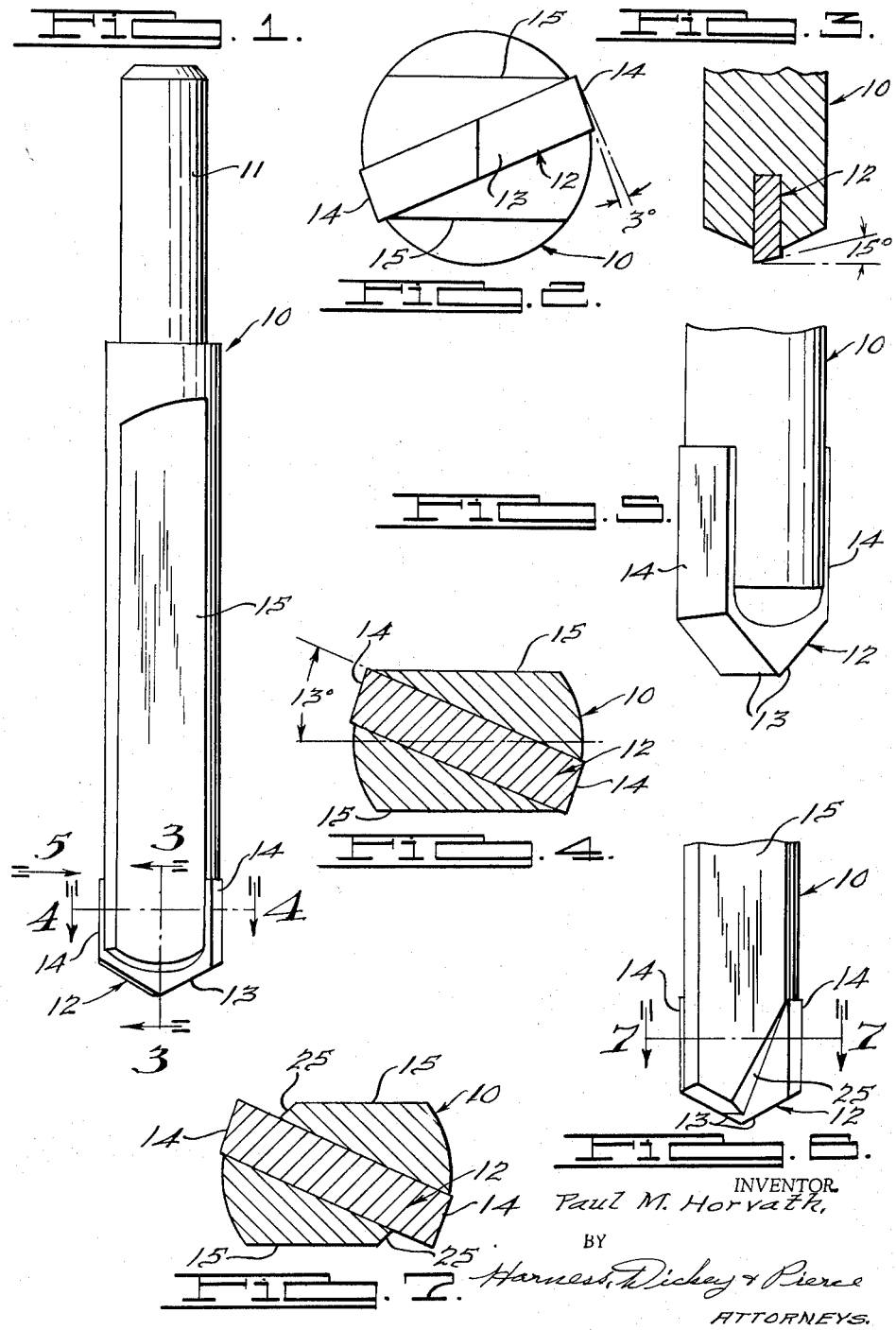

3,198,270
DRILL BIT WITH INSERT
Paul M. Horvath, Detroit, Mich., assignor to Horvath Tool and Manufacturing Company, Detroit, Mich., a corporation of Michigan
Filed Mar. 26, 1963, Ser. No. 268,127
1 Claim. (Cl. 175—410)

This invention relates to drill bits and, more particularly, to improvements in masonry drill bits.

One of the objects of this invention is to provide a drill bit, the shank of which is substantially oblong in cross section providing opposed flat sides forming large capacity flutes or relief areas to permit the ready escape of grit and dust from the hole during drilling and to provide a shank portion providing the maximum area of surface contact between the blade and shank in which the blade is angularly disposed.

Another object of the invention is to provide a device of this type in which the shank of the bit is subsantially oblong in cross section thus providing flat sides and in which the blade is disposed within the shank at an angle to the flat sides thereof and extends between the diametrically opposed corners thereof entirely between the flat sides so as not to reduce the cross-sectional area of the flat sides or the area of contact between the blade and shank.

Another object of the invention is to provide a drill bit which may be used both for straight rotary drilling but also for impact or percussion drilling and to provide means for effecting the maximum support for the blade in the shank whereby to provide a bit which will be rugged and adequate to withstand the pounding and abuse to which it is subjected in use.

The various objects and advantages, and the novel details of construction of two commercially practical embodiments of the invention, will become more apparent as this description proceeds, especially when considered in connection with the accompanying drawings, in which:

FIGURE 1 is an elevational view of a drill bit constructed in accordance with this invention;

FIGURE 2 is an enlarged and elevation of the cutting end;

FIGURE 3 is an enlarged fragmentary vertical sectional view of the cutting end taken on line 3—3 of FIGURE 1;

FIGURE 4 is an enlarged transverse sectional view taken substantially on the plane indicated by line 4—4 in FIGURE 1;

FIGURE 5 is a fragmentary view looking in the direction of arrow "5" in FIGURE 1;

FIGURE 6 is a fragmentary view similar to FIGURE 1 showing a slightly modified form of construction; and FIGURE 7 is a view similar to FIGURE 4 showing this modification, taken on line 7—7 of FIGURE 6.

In the drawings, the reference character 10 indicates generally the shank of the bit which is formed with the usual terminal portion 11 which fits into a drill chuck or the like (not shown). A carbide cutting blade 12 which is set into the opposite end of the shank 10 is here shown provided with an auger point having a tapered end 13 and sides 14 although the blade may be formed with a chisel edge according to conventional practice. In any event, the sides 14 extend laterally beyond the shank 10 so that the width of the blade determines the diameter of the hole being drilled by the bit. Also, it will be observed that the side edges 14 of the blade are provided with a 3° relief, as shown in FIGURE 2, and the edges of the tapered end 13 have a 15° relief, as shown in FIGURE 3.

The sides of the shank 10 are cut or ground to provide diametrically opposed flat sides 15 so that the portion of the shank 10 provided with the flat surfaces 15 is substantially oblong shaped in cross section. Conventional drill bits of this type are formed with either spiral flutes or straight flutes to permit the escape of grit and dust from the hole during drilling. By providing the extended flat sides 15, relief areas or flutes of large capacity are provided to permit the ready escape of grit and dust from the hole. In a typical bit embodying the invention, thirty-six percent of the hole drilled by the bit is open (flute area) for escape of dust and ground particles from the hole. Consequently, there is less tendency for the bit to bind in the hole and less heat is generated during the drilling operation which otherwise would destroy or damage the edge of the cutting blade.

The cutting blade 12 is disposed within the shank of the bit at an angle to the flat sides 15 and extends between diametrically opposed corners of the oblong shaped shank portion of the bit. As shown in FIGURE 4, this places the cutting blade 12 diagonally of the shank portion of the bit and entirely between the flat sides 15 thereof so that the cutting blade 12 does not extend into the flat portions 15 to thereby reduce the unobstructed cross-sectional area of these flat portions or the area of contact between the blade and shank. By this diagonal disposition of the cutting blade 12, as shown, the maximum area of surface contact between the blade and shank 10 is obtained. Also, the diagonal position of the blade 12 between the flat sided flutes affords maximum support for the blade and minimum interference with the cutting edge of the blade. As shown in FIG. 4, the thin tapered edges of the shank 10 support the blade 12 substantially to the cutting edge of the latter bit at the same time the thinness and the taper permit easy escape of the ground dust and grit from the holes. The heavy, relatively thick butt sections of the shank 10 behind the trailing edges of the blade 12 provide maximum strength and support for the blade and assure a rugged construction, this minimizes possibility of the blade breaking from the shank in use.

The cutting blade 12 is secured in the shank by being silver soldered, induction brazed, or in any other desired or preferred manner.

Drill bits of this type are used not only in straight rotary drilling, but also in impact or percussion drilling. During the latter operation, the drill is reciprocated as it is rotated so that it pounds against the bottom of the hole and under these conditions the bit takes severe physical abuse. The cutting blade 12, which is usually made of carbide, is brittle and must be adequately supported, or it will break out of the shank under these conditions. The present arrangement, in which the cutting blade extends diagonally between the diametrically opposed edges of the oblong shaped shank, provides a maximum area of surface contact between the blade and the shank as suggested, provides a maximum thickness of shank and consequently maximum strength and a most firm and solid support immediately behind each cutting edge of the blade, the result is a bit which is rugged and adequate to withstand the pounding and abuse to which it is subjected in use. Also, it is important in this invention that the relief areas provided by the flat sides 15 be maintained intact and unobstructed so as to permit the ready escape of the grit and dust from the hole during the drilling operation. With the present invention, the cutting blade 12 extends between these surfaces 15 and not into the same, and does not reduce the area of these flat portions. Also, with this invention, the maximum surface contact is obtained between the cutting blade 12 and the shank portion of the drill bit so that the cutting blade will be held firmly in place at all times.

In FIGURES 6 and 7, a slightly modified form of construction is illustrated, in which the portion of the shank 10 which engages the cutting blade 12 is cutting away, or angularly relieved as at 25, at each leading face of the blade 12. This is usually done to facilitate sharpening of the blade, but it also assists in permitting the escape of grit and dust from the area in which the drill bit is operating. In this form of construction, as in the one previously described, the cutting blade 12 is angularly disposed between the diametrically opposed corners of the substantially oblong shaped shank portion of the bit, and does not extend into the flat sides 15 thereof to reduce their unobstructed cross-sectional area. Also, the area of surface contact between the shank portion and the cutting blade is maintained at a substantial maximum.

While two commercially practical embodiments of the invention have been described and illustrated herein somewhat in detail, it will be understood that various changes may be made as may come within the purview of the accompanying claim.

What is claimed is:

In a drill bit of the class described, a shank portion substantially oblong in cross section providing opposed flat sides forming large capacity flutes to permit the escape of grit and dust from the hole during drilling, and a flat cutting blade secured in the end of said oblong shank portion by brazing, soldering, or the like, said blade extending angularly with respect to said flat sides between diametrically opposed corners of said oblong shank portion thereby providing an extended surface contact with said shank portion, said blade being located substantially entirely between the surfaces of said flat sides so as not to reduce the area of said flutes, said shank portion being cut away at the leading edge of the blade to provide an angular relief to facilitate sharpening of the blade.

References Cited by the Examiner

UNITED STATES PATENTS 2,400,856  5/46  Thompson _____ 77—67
2,756,967  7/56  Meutsch _____ 175—410

FOREIGN PATENTS 600,276  6/34  Germany.

BENJAMIN HERSH, *Primary Examiner.*